W. M. Ferry, Jr.
Circular Saw Mill.
Reissued Apr. 6, 1858.
No 542.
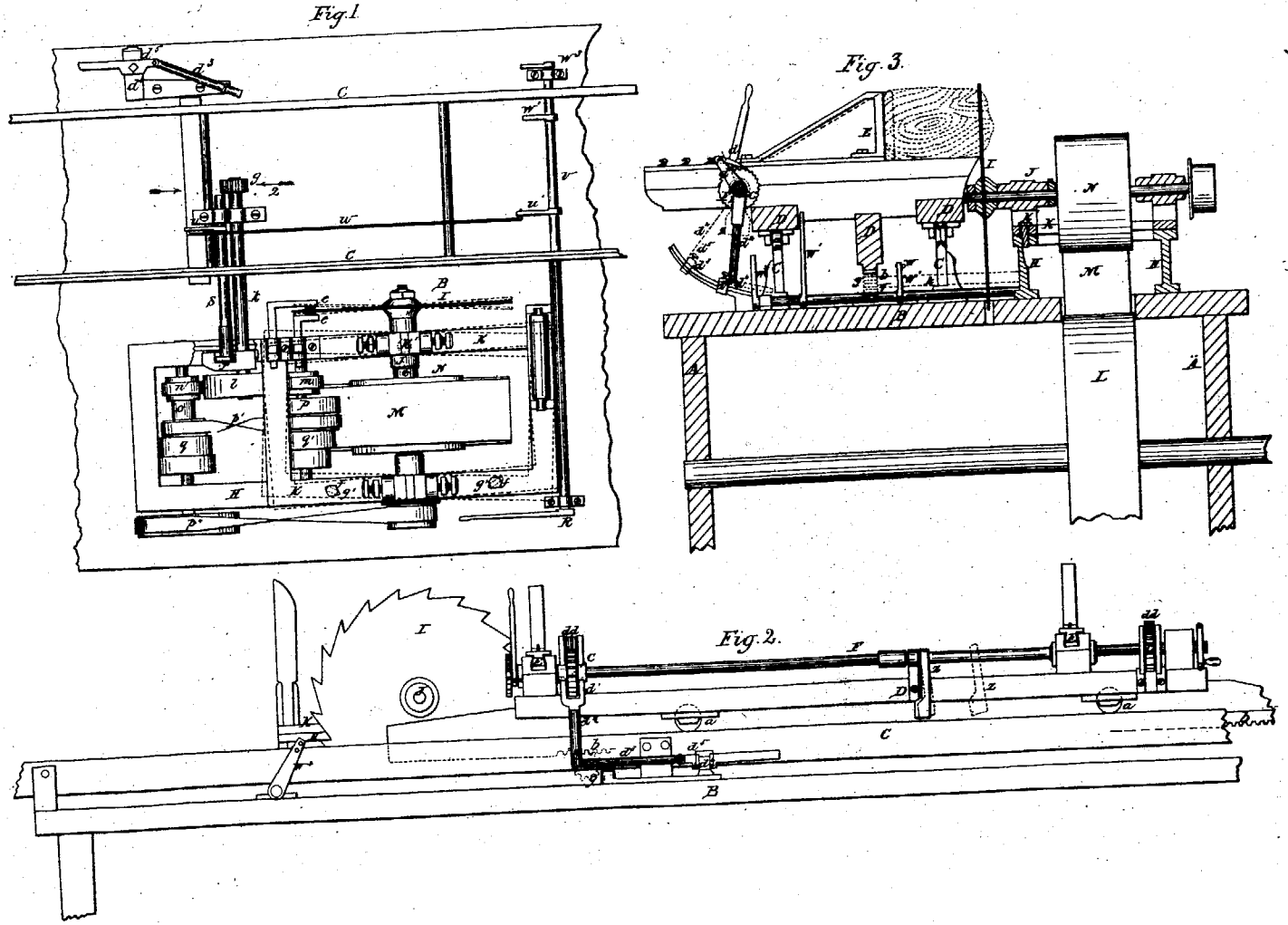

UNITED STATES PATENT OFFICE.

WILLIAM M. FERRY, JR., OF FERRYSBURG, MICHIGAN.

IMPROVED SAWING-MILL.

Specification forming part of Letters Patent No. 17,829, dated July 21, 1857; Reissue No. 542, dated April 6, 1858.

*To all whom it may concern:*

Be it known that I, WM. M. FERRY, JR., of Ferrysburg, in the county of Ottawa and State of Michigan, have invented a new and useful Improvement in Circular-Saw Mills; and I do hereby declare that the following is a full, clear, and exact description of the same, reference being had to the accompanying drawings, forming a part of this specification, in which—

Figure 1 is a top view of a circular-saw mill with my improvements. Fig. 2 is a side view of the same, and Fig. 3 a vertical transverse section of the same.

Similar letters of reference in each of the several figures indicate corresponding parts.

My invention embraces, first, an arrangement consisting of a yoke carrying the saw-guides, saw-arbor, and saw-boxes, and pivoted at its side next the saw, and made adjustable in the path of a circle by means of slots and set-screws, as presently described, for the purpose of ranging or controlling more conveniently than heretofore the cut of the saw, or causing it to have a tendency to cut toward the log or toward the slab by giving it a slight obliquity to a line parallel with the log-carriage, and thus prevent the heating of the saw, and give it its proper range for cutting accurately.

It consists, secondly, in effecting by means of an eccentric, as presently described, the combination of the log-carriage and automatic reversing mechanism, thereby rendering the saw-mill capable of self-feeding and self-gigging.

It consists, thirdly, in so adjusting the gaging-incline that its hinged or pivoted point and its opposite end or terminus shall always be at the same and equal distance from the set-shaft, thus preventing the liability of the laterally-feeding ratchet-lever becoming disconnected from the gaging-incline at the moment when the carriage has nearly completed its backward movement, and also insuring a more regular set than by the means heretofore adopted.

It consists, fourthly, in the application, in the manner described, of the adjustable self-fastening trip *z* to a saw-mill, which operates with a continuous rapid motion back and forth, in combination with the vibrating reversing-stop $w^2$, in the manner and for the purposes presently specified.

To enable others skilled in the art to make and use my invention, I will proceed to describe its construction and operation.

A is intended to represent the framing, and B the flooring, of a saw-mill building. C C are rails for the carriage to run upon. D is the carriage, furnished with friction wheels *a a* and with a toothed rack, *b*, on its under side. E E are the head blocks of the carriage; F, the set-shaft, with feeding-ratchet *c* and pawls *d d*, for feeding the head-blocks laterally. *g* is a pinion for giving motion to the carriage by gearing into the rack *b* of the same. H is a metal frame bolted firmly to the flooring B, and serving for carrying all the mechanism bearing a close relation to the saw. I is the saw; J, its arbor, and K a yoke resting upon the frame and having the arbor of the saw and the saw-guides *e e* arranged on it. L M N represent the gearing for driving the saw-arbor.

The above-described parts, as a general thing, are all common to saw-mills, and are simply referred to in order to explain more readily and clearly my improvements, which are as follows: The yoke K is attached to the frame H by means of a pivot, K′, and set-screws *f f*, which pass through oblong slots *g′ g′* of the yoke, so that it, with the saw and arbor, may be adjusted obliquely to a line parallel with the log-carriage, as illustrated in red and blue lines in Fig. 1, and the saw thereby caused to have an inclination to cut toward the log or toward the slab or board, and the saw thus properly ranged for cutting accurately. The shaft *k* of the pinion *g* is fitted in a sliding box, *k′*, and furnished with a pulley, *l*, on its inner end. This pulley is situated between two leather friction-wheels, *m n*, which have shafts *o p*, which carry each a cone of pulleys, *q q′*, one cone being arranged just the reverse of the other, and the two being connected together by a crossed belt, *p′*. In the sliding box *k′* of the shaft is fitted loosely a cam or eccentric, *r*, which is made fast on a shaft, *s*. By this arrangement it may be evident that by turning the shaft *s* a quarter of a revolution in the direction of the arrow 1 the eccentric will cause the sliding box *k′* to move in the direction of the arrow 3, and in moving to move the shaft $k$ and pulley $l$ sufficiently far to cause pulley $l$ to bite firmly upon the leather friction-wheel $m$, and thus be in a condition for being turned thereby when the friction-wheel $m$ is set in motion by the belts $p'$ $p^2$, and it is desired to gig back the carriage D; and it may also be evident that by turning the shaft $s$ in the direction of the arrow 2 the eccentric will cause the sliding box $k'$ to move the pulley $l$ in contact with the leather friction-wheel $n$, and thus place it in a condition for being operated thereby when the friction-wheel $n$ is set in motion, and it is desired to feed forward.

To render the shifting of the pulleys automatic at the back and forward movements of the carriage, a projection or arm, $u$, is placed at right angles on the shaft of the eccentric. This arm is connected with an arm, $u'$, on the rocking shaft $v$ by a rod, $w$. On the rocking shaft $v$ two other projections or arms, $w'$ $w^2$, are arranged, one being placed at right angles to the other, so that when one is down or out of the way of the carriage the other is up or in the way of the same. One of these arms is operated by a stationary cross-piece, $x$, of the carriage, and the other by an adjustable self-holding trip, $z$, on the set-shaft of the feeding-ratchet $c$, $w'$, being operated as the carriage is gigged back and $w^2$ as the carriage is fed forward.

To regulate the extent of movement to the carriage, the trip $z$ is fitted over and made capable of sliding on the set shaft F, so that it may be shifted, as illustrated by red dotted lines in Fig. 1. The trip $z$, owing to being fitted loosely over the shaft as shown, no matter how adjusted, holds itself firm by biting upon the shaft when inclined, as illustrated by full red lines in Fig. 1.

To render the feeding of the board laterally by the head-blocks automatic, the upper part, $d'$, of the ratchet-lever $d^2$ is arranged loosely on the set-shaft F, and the lower part is suspended so as to barely clear the set-bar $d^4$, and to one side and at a short distance forward of the saw a gaging pivoted incline, $d^3$, is provided for said ratchet-lever $d^2$ to run upon as the carriage is gigged back. The gaging incline is made adjustable on a curved set-bar, $d^4$, by means of set-screw $d^5$, the curve of the set-bar being concentric with the axis of the set-shaft F, and the hinged end of the gaging-incline in line with the set-shaft. By this arrangement it may be evident that as the arm ascends the gaging-incline, as illustrated in red in Fig. 3, it is raised gradually, and the pawls $d$ $d$ consequently made to turn the feed-ratchet $c$, which in turn turns the shaft F and causes the pinions on its two ends to take into the racks of the head-blocks, and thus cause the head-blocks to have sufficient lateral movement to feed the log the required distance, as illustrated by black and red dotted lines in Fig. 2. The amount of the lateral feed is regulated by the obliquity and inclination of the gaging-incline $d^3$ from a horizontal line to the flooring and to a parallel line with the edge of the carriage, both of which are regulated by the extent of movement which the gaging-incline has over the curved set-bar $d^4$, which, owing to its curved form, insures the constant contact of the ratchet-lever at nearly the same length of leverage during the whole of the setting operation, and then allows said lever an unobstructed passage past the setting device without danger of the lever getting out of proper connection with the same.

This saw-mill is automatic in its longitudinal and lateral feed after it has once been adjusted by the hand-lever R ready for commencing operations; it is self-reversing and free from the objections urged against the use of belts or cogged gear to reverse the motion of the carriage; it is capable of having the extent of its feed both laterally and longitudinally regulated in a moment of time; and, viewing it altogether, it is much to be preferred to the many devices heretofore contrived for accomplishing the same objects as are accomplished by it.

I am aware that circular saws have been rendered adjustable obliquely to the kerf for the purposesdescribed; and, therefore,

What I claim as my invention, and desire to secure by Letters Patent, is—

1. The particular means and their arrangement, as described, for accomplishing that end.

2. Effecting by means of an eccentric the combination of the log-carriage and automatic reversing mechanism, thereby rendering the saw-mill capable of self-feeding and self-gigging, as set forth.

3. So adjusting the gaging-incline $d^3$ that its hinge or pivoted joint and its opposite end or terminus shall always be at the same and equal distances from the set-shaft F, as described.

4. The application, in the manner described, of the adjustable self-fastening trip $z$ to a saw-mill which operates with a continuous rapid motion back and forth, in combination with the vibrating reversing-stop $w^2$, substantially as and for the purposes set forth.

The above specification of my improvement in saw-mills signed by me this 12th day of March, 1857.

WM. M. FERRY, JR.

Witnesses:
N. BRUNING,
B. F. EAMES.